United States Patent
Chai et al.

(10) Patent No.: US 11,483,682 B2
(45) Date of Patent: Oct. 25, 2022

(54) METHOD, BASE STATION AND USER EQUIPMENT FOR MULTICASTING AND DEVICE WITH A STORAGE CAPABILITY

(71) Applicant: JRD Communication (Shenzhen) LTD., Shenzhen (CN)

(72) Inventors: Shuqi Chai, Shenzhen (CN); Kin nang Lau, Shenzhen (CN); An Liu, Shenzhen (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 75 days.

(21) Appl. No.: 16/648,776

(22) PCT Filed: Sep. 20, 2017

(86) PCT No.: PCT/CN2017/102418
§ 371 (c)(1),
(2) Date: Mar. 19, 2020

(87) PCT Pub. No.: WO2019/056201
PCT Pub. Date: Mar. 28, 2019

(65) Prior Publication Data
US 2020/0221266 A1    Jul. 9, 2020

(51) Int. Cl.
*H04W 4/08* (2009.01)
*H04W 28/02* (2009.01)
(Continued)

(52) U.S. Cl.
CPC ......... *H04W 4/08* (2013.01); *H04W 28/0278* (2013.01); *H04W 72/0413* (2013.01); *H04L 12/189* (2013.01)

(58) Field of Classification Search
CPC .............. H04W 4/08; H04W 28/0278; H04W 72/0413; H04L 12/189
See application file for complete search history.

(56) References Cited

U.S. PATENT DOCUMENTS 8,588,589 B2    11/2013   Adimatyam et al.
9,304,961 B2    4/2016    Schroder et al.
(Continued)

FOREIGN PATENT DOCUMENTS

CN    102833685    12/2012
CN    104641609    5/2015
(Continued)

OTHER PUBLICATIONS

International Search Report and the Written Opinion dated Jun. 1, 2018 from the International Searching Authority Re. Application No. PCT/CN2017/102418. (6 Pages).
(Continued)

*Primary Examiner* — Christopher M Crutchfield
*Assistant Examiner* — Tito Q Pham (57) ABSTRACT

A method, base station and user equipment for multicasting and a device with a storage capability are disclosed in the present disclosure. The method for multicasting includes the following steps of: receiving, by a base station, queue state information transmitted in a time division manner by different user equipments (UEs) in a multicast group; and estimating queue state information of at least another part of UEs in the multicast group according to the received queue state information of the UEs. In this way, the present disclosure can enable the resource allocated to each of the UEs by the base station to match the queue state information of the UE, thereby avoiding the waste of resources without influencing the play effect.

16 Claims, 6 Drawing Sheets

(51) Int. Cl.
*H04W 72/04* (2009.01)
*H04L 12/18* (2006.01)

(56) References Cited

U.S. PATENT DOCUMENTS

| | | | |
|---|---|---|---|
| 10,015,715 | B2 | 7/2018 | Kim et al. |
| 10,225,698 | B2 | 3/2019 | Vaidya et al. |
| 10,542,521 | B2 | 1/2020 | Zhang et al. |
| 10,735,823 | B2 | 8/2020 | Harden et al. |
| 11,080,001 | B2 | 8/2021 | Millington |
| 2003/0023739 | A1 | 1/2003 | Ngoc Vu |
| 2006/0182022 | A1* | 8/2006 | Abedi ............... H04W 72/1278 370/229 |
| 2011/0044192 | A1* | 2/2011 | Wang ............... H04W 72/1221 370/252 |
| 2011/0287738 | A1* | 11/2011 | Peisa ............... H04W 72/0486 455/405 |
| 2014/0003320 | A1* | 1/2014 | Etemad ............... H04W 76/40 370/312 |
| 2016/0007316 | A1 | 1/2016 | Vaidya et al. |
| 2016/0057249 | A1 | 2/2016 | Karthikeyan et al. |
| 2016/0315876 | A1 | 10/2016 | Sinha et al. |
| 2016/0342385 | A1 | 11/2016 | Millington |
| 2017/0019439 | A1 | 1/2017 | Kim et al. |
| 2017/0019882 | A1* | 1/2017 | Nimbalker ............ H04W 74/02 |
| 2017/0048595 | A1 | 2/2017 | Hybertson et al. |
| 2018/0262945 | A1* | 9/2018 | Yi ..................... H04W 72/0446 |
| 2018/0367844 | A1* | 12/2018 | Fu ..................... H04N 21/25841 |
| 2019/0386931 | A1 | 12/2019 | Sinha et al. |
| 2020/0374866 | A1* | 11/2020 | Takeda ............... H04L 5/0053 |

FOREIGN PATENT DOCUMENTS

| | | |
|---|---|---|
| CN | 106131780 | 11/2016 |
| EP | 1654614 | 5/2006 |
| WO | WO 2015/065053 | 5/2015 |
| WO | WO 2016/147093 | 9/2016 |
| WO | WO 2017/014939 | 1/2017 |
| WO | WO 2019/0156201 | 3/2019 |

OTHER PUBLICATIONS

ARIB. "Study of Requirements of IP-Multimedia Subsystem (IMS) Convergent Multimedia Conferencing (Release 13)", 3rd Generation Partnership Project, Technical Specification Group Services and System Aspects, 3GPP TR 22.948 V13.0.0., Technical Report, p. 1-23, Dec. 31, 2015.

Aydin et al. "Final Report on Network-Level Solutions: Deliverable D4.3", METIS, Project Name: Mobile and Wireless Communications Enablers for the Twenty-Twenty Information Society, METIS, Document No. ICT-317669-METIS/D4.3, p. 1-148, Mar. 1, 2015.

Technical Specification "3rd Generation Partnership Project; Technical Specification Group Services and System Aspects; Transparent End-to-End Packet-Switched Streaming Service (PSS); General Description (Release 11)", 16.P, Sep. 2019.

Notification of Notice of Allowance and Search Report dated Nov. 2, 2021 From the State Intellectual Property Office of the People's Republic of China Re. Application No. 201780096084.5. (4 Pages).

* cited by examiner

METHOD, BASE STATION AND USER EQUIPMENT FOR MULTICASTING AND DEVICE WITH A STORAGE CAPABILITY

RELATED APPLICATIONS

This application is a National Phase of PCT Patent Application No. PCT/CN2017/102418 having International filing date of Sep. 20, 2017. The contents of the above application is all incorporated by reference as if fully set forth herein in their entirety.

FIELD AND BACKGROUND OF THE INVENTION

The present disclosure generally relates to the technical field of communication, and more particularly, to a method, base station and user equipment for multicasting and a device with a storage capability.

With the rapid development of wireless network technologies, the importance of video streaming is becoming increasingly outstanding. When the number of user equipments (UEs) is relatively small, a point-to-point transmission mode may be adopted to effectively utilize spectrum resources. However, when a large number of users of UEs need to receive the same content at the same time, a point-to-multipoint multicasting mode is preferred. In 3GPP, the enhanced Multimedia Broadcast/Multicast Service (eM-BMS) is adopted to meet simultaneous requirements of multiple mobile UEs for multimedia contents.

In the application of multimedia data streaming, user experience of each of the UEs will be influenced by the state of a playback buffer of the UE. Specifically, playback interruption occurs when the playback buffer underflows and this is highly undesirable for steady and smooth video streaming. If vedio playback bit rate is higher than the system available capacity, playback buffer will run empty easily and it degrades users' quality of experience. Playback buffer overflow causes incoming video packets dropped and may results in wastages of wireless resource for the future retransmission. Moreover, wireless network communication channels between a base station and UEs are assigned randomly and fluctuations occur randomly in these channels, thereby influencing the exchange efficiency of the data packet.

In the point-to-point unicasting mode, a resource allocation solution is available in which the UE may feed the buffer state thereof back to the base station periodically so that the base station can adjust the rate at which the data stream is transmitted and the data volume according to the buffer state of the UE. However, in the multicasting mode adopting the eMBMS, no solution is available for adjusting the resource allocation according to the buffer state of the UE.

SUMMARY OF THE INVENTION

A primary objective of the present disclosure is to provide a communication method, which can reduce uplink resource consumption and avoid the waste of resources while obtaining a good play effect.

To achieve the aforesaid objective, the present disclosure provides a technical solution as follows: a method for multicasting comprises: receiving, by a base station, queue state information (QSI) transmitted in a time division manner by different user equipments (UEs) in a multicast group; estimating QSI of at least another part of the UEs in the multicast group according to the received QSI of the UEs.

To achieve the aforesaid objective, the present disclosure provides another technical solution as follows: acquiring current QSI by UEs in a multicast group; transmitting the QSI to the base station by the UEs, wherein different UEs in the multicast group are preset to transmit the respective QSI in a time division manner so that, at each time slot, according to the updated QSI, QSI of at least another part of the UEs in the multicast group is estimated by the base station.

To achieve the aforesaid objective, the present disclosure provides yet another technical solution as follows: a base station comprises a first processor and a first communication circuit coupled to each other, wherein the first processor operates in combination with the first communication circuit to execute the method as described above.

To achieve the aforesaid objective, the present disclosure provides another technical solution as follows: a UE comprises a second processor and a second communication circuit coupled to each other, wherein the second processor operates in combination with the second communication circuit to execute the method as described above.

To achieve the aforesaid objective, the present disclosure provides yet another technical solution as follows: a device with a storage capability is characterized in that, the device is stored with instructions which, when being executed, accomplish the method as described above.

As compared to the prior art, benefits of the present disclosure are as follows: in the present disclosure, queue state information transmitted by UEs is received, and the queue state information of other UEs is estimated according to the received queue state information so that the base station can adjust resources allocated to corresponding UEs according to the queue state information, thereby reducing uplink resource consumption and avoiding the waste of resources while obtaining a good play effect.

DESCRIPTION OF SPECIFIC EMBODIMENTS OF THE INVENTION

Technical solutions of embodiments of the present disclosure will be described clearly and completely with reference to the attached drawings illustrating the embodiments of the present disclosure. Obviously, the embodiments described herein are only a part of but not all of the embodiments of the present disclosure. All other embodiments that can be obtained by those of ordinary skill in the art from the embodiments of the present disclosure without making creative efforts shall fall within the scope of the present disclosure.

Figure 1:
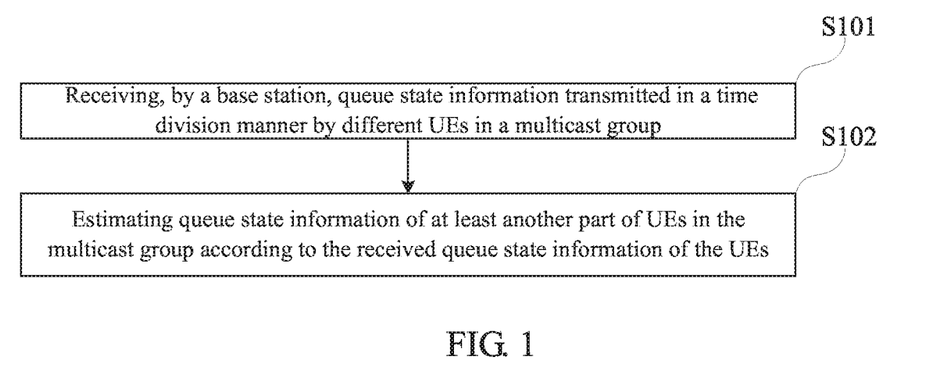
FIG. 1 is a schematic flowchart diagram of a first embodiment of a method for multicasting according to the present disclosure.

Referring to FIG. 1, FIG. 1 is a schematic flowchart diagram of a first embodiment of a method for multicasting according to the present disclosure, and the method for multicasting according to the present disclosure comprises the following steps of:

S101: receiving, by a base station, queue state information (QSI) transmitted in a time division manner by different user equipments (UEs) in a multicast group.

In a specific implementation scenario, one eMBMS multicast group comprises at least one base station and several UEs connected with the base station in a wireless manner. Each of the UEs measures the queue state information thereof in real time and transmits the queue state information to the base station. The queue state information of one UE represents the state of a playback buffer level of the UE. When the rate at which the video data stream is transmitted by the base station is too fast as compared to the play rate of the UE or the video data volume is excessively large as compared to the capacity of the playback buffer, the video data packet transmitted by the base station cannot be received completely by the UE and the data packet of the video transmitted by the base station will be lost during the transmission. So the base station needs to re-transmit the data packet being lost, thereby causing the waste of resources. When the data volume of the video transmitted by the base station is excessively small as compared to the capacity of the playback buffer, so that the video cannot be played smoothly, thereby influencing the user experience.

Therefore, the base station receives, via the uplink, the queue state information transmitted by the UEs for the purpose of adjusting the rate at which the video data stream is transmitted to the UEs and the video data volume according to the queue state information. Fluctuations may occur randomly in transmission channels to influence the transmission rate and quality, and the capacity of the playback buffer of each of the UEs also changes dynamically. Therefore, the base station needs to receive, at regular intervals, the queue state information transmitted by the UE and adjust the resource allocated to the UE timely according to the change in the queue state information of the UE (e.g., adjust the rate at which the video data stream is transmitted and the video data volume or the like) so that the resource allocated to the UE matches the current queue state information of the UE.

Since resources of an uplink of a base station are limited, the uplink may possibly be blocked and some data may even be lost when a relatively large number of UEs are connected to the base station and require the uplink to transmit the queue state information of the multiple UEs at the same time. In order to avoid the occurring of the above situation, the base station receives the queue state information transmitted in a time division manner by different UEs, i.e., performs an overall control on the action of transmitting the queue state information by the UEs connected to the base station so that the UEs connected to the base station transmit the queue state information to the base station in a certain order or transmit the queue state information by turns in a time division manner. In a relatively extreme application scenario, only the queue state information of one UE is received by the base station in a transmission cycle to ensure the smoothness of the uplink. Of course, in other application scenarios, the queue state information of a set number of UEs (e.g., more than one UEs) may be received by the base station in a transmission cycle as long as the action of transmitting the queue state information by the UEs is overall controlled and the smoothness of the uplink is ensured. In this case, "in a time division manner" means performing an overall control on the action of transmitting the queue state information by the UEs connected to the base station so that the set number of UEs transmit the queue state information at a different time or at a different cycle from other UEs.

In other implementation scenarios, the action of transmitting the queue state information by the UEs to the base station may also be triggered by an event. For example, in a transmission cycle, the UE having the poorest queue state information transmits the queue state information thereof to the base station. Alternatively, the UEs respectively having the best queue state information and the poorest queue state information transmit the queue state information thereof to the base station, so the base station can take the two pieces of queue state information as reference to ensure that the allocated resources suit most of the UEs connected to the base station.

In other implementation scenarios, the base station may establish an uplink dedicated control channel to receive the queue state information transmitted in a time division manner by different UEs in the multicast group, thereby ensuring the high reliability and the high rate of the transmission.

S102: estimating queue state information of at least another part of UEs in the multicast group according to the received queue state information of the UEs.

In the aforesaid implementation scenario where only the queue state information of one UE is received by the base station in a cycle, the state of the UE that transmits the queue state information may not represent the states of all the UEs in the eMBMS multicast group connected to the base station, and directly performing adjusting according to the queue state information may cause a poor play effect for other UEs or cause the waste of resources. Therefore, the present disclosure proposes to estimate queue state information of at least another part of UEs through a method of estimation. In this way, the base station can adjust the resources allocated to the UEs according to the current queue state information estimated for the UEs.

In another specific implementation scenario, the base station presets a virtual queue state information table, and the virtual queue state information table stores the current queue state information of each of the UEs in the eMBMS multicast group. When the base station receives the queue state information transmitted by one UE at a certain time point, the base station updates the received queue state information into a corresponding location in the virtual queue state information table, and also updates the queue state information of at least another part of UEs that is estimated according to the received queue state information into corresponding locations in the virtual queue state information table. In this way, the base station can allocate resources to each of the UEs in the eMBMS multicast group according to the contents in the virtual queue state information table.

As can be known from the above descriptions, in this embodiment, the base station receives the queue state information transmitted in a time division manner by different UEs which connected to the base station and adjusts the resources allocated to each of the UEs according to the queue state information so that the resource allocated to each of the UEs match the current queue state information of the UE. In this way, the waste of resources is avoided, the real-time play effect of each of the UEs is guaranteed and meanwhile resource consumption of the uplink is reduced.

Figure 2:
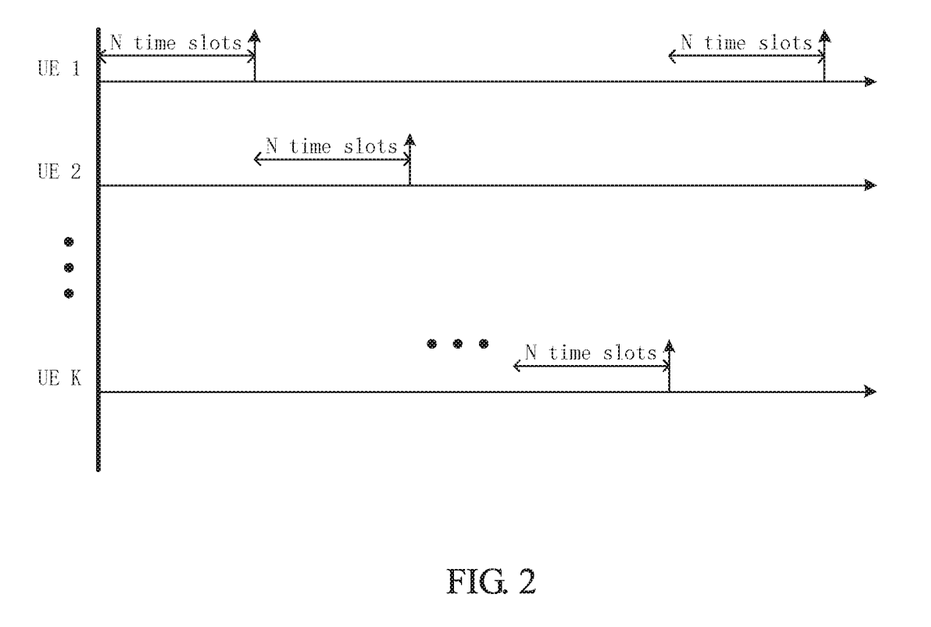
FIG. 2 is a schematic diagram illustrating the principle of estimating queue state information of at least another part of UEs in a multicast group according to the present disclosure.

Referring to FIG. 2, FIG. 2 is a schematic diagram illustrating the principle of estimating queue state information of at least another part of UEs in a multicast group according to the present disclosure.

As shown in FIG. 2, UE 1 to UE k are k UEs connected to a same base station, and the base station defines N time slots as a transmission time interval (TTI) of transmitting the queue state information, i.e., a UE transmits the real-time queue state information at intervals of every N time slots. In this implementation scenario, the k UEs transmit the queue state information to the base station by turns, i.e., the UE 1, UE 2, . . . , UE k transmit the queue state information to the base station in succession. In other implementation scenarios, maybe a randomly selected UE transmits the real-time queue state information to the base station, or the UE having the best or the poorest queue state information transmits its real-time queue state information to the base station in a transmission cycle.

In a same eMBMS multicast group, the received video data volume and the played video data volume of each of the UEs are equal to one another, and there is even little difference between the bit error ratios of the data received by each of the UEs. Therefore, dynamic changes in queue state information of the different UEs in the same eMBMS multicast group may correlate with each other through the similar operations for receiving and playing the video data stream among the UEs.

In a specific implementation scenario, the UE k transmits the real-time queue state information $Q_k(t+1)$ thereof at a time t+1. Since the UEs transmit the queue state information by turns in this implementation scenario, other UEs do not transmit the real-time queue state information at this time. It is known that the UE k does not transmit the queue state information thereof at the time ahead of t+1 by one cycle of interval, i.e., at a time t, so the base station estimates the queue state information $\tilde{Q}(t)$ of the UE k and the queue state information $\tilde{Q}_n(t)$ of other UEs at the time t, and estimate the queue state information $\tilde{Q}_n(t+1)$ of other UEs (wherein n≠k) according to the following estimation equation:

$$\tilde{Q}_n(t+1)=\tilde{Q}_n(t)+(Q_k(t+1)-\tilde{Q}_k(t))$$

The above estimation of the queue state information of the UEs is based on the fact that the there is little difference between the changes in the queue state information of different UEs in the same eMBMS multicast group in one transmission time interval.

Because in the same eMBMS multicast group, the received video data volume and the played video data volume of each of the UEs are equal to one another, and there is even little difference between the bit error ratios of the data received by each of the UEs, there is little difference between the changes in the queue state information of different UEs in the same eMBMS multicast group in one transmission time interval. Therefore, it can be learnt that a difference between the real-time queue state information of the UE k at the time t+1 and the estimated queue state information of the UE k at the time t is approximately equal to a difference between the real-time queue state information of the UE n at the time t+1 and the estimated queue state information of the UE n at the time t. Thus, the estimated queue state information of the UE n at the time t+1 is equal to the estimated queue state information of the UE n at the time t plus the difference between the real-time queue state information of the UE k at the time t+1 and the estimated queue state information of the UE k at the time t.

In other implementation scenarios, if the UE n is right the UE transmitting the real-time queue state information at the time t, then the estimation equation may be modified into $\tilde{Q}_n(t+1)=Q_n(t)+(Q_k(t+1)-\tilde{Q}_k(t))$, i.e., the estimated queue state information of the UE n at the time t+1 is equal to the real-time queue state information of the UE n at the time t plus the difference between the real-time queue state information of the UE k at the time t+1 and the estimated queue state information of the UE k at the time t.

In other implementation scenarios, the k UEs may be grouped into m (m≠k) groups, and more than two UEs are grouped into one group. For the m groups of UEs, the queue state information of at least one UE among the UEs comprised in each of the m groups is transmit to the base station in succession or disorderly. The queue state information being transmitted may be the queue state information of all the UEs in each of the m groups, may be the queue state information of one or more UEs randomly selected from each of the m groups, may be the queue state information of one or more UEs in a group transmitted in a certain order, or may be an average value of the queue state information of the UEs in a group. The base station can estimate the queue state information of all or part of the UEs in other groups according to the received queue state information of one or more UEs by using the above equation.

As can be known from the above descriptions, the current queue state information of other UEs can be estimated in this embodiment according to the principle that a difference between the real-time queue state information of a UE transmitted currently and the estimated queue state information of the same UE at the time ahead of the current time by a transmission time interval is approximately equal to the difference between the current queue state information of another UE and the estimated queue state information of the another UE at the time ahead of the current time by a transmission time interval.

Figure 3:
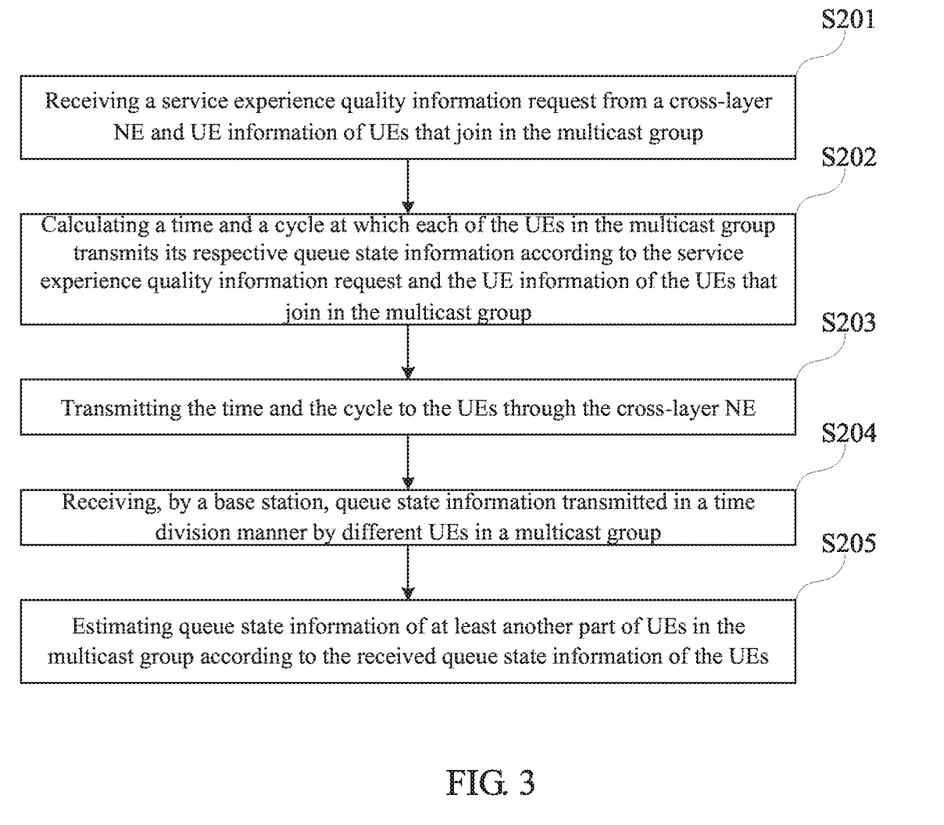
FIG. 3 is a schematic flowchart diagram of a second embodiment of the method for multicasting according to the present disclosure.

Referring to FIG. 3, FIG. 3 is a schematic flowchart diagram of a second embodiment of the method for multicasting according to the present disclosure, and the method for multicasting according to the present disclosure comprises the following steps of:

S201: receiving a quality of experience metrics and UE information of UEs that join in the multicast group from a cross-layer network element (NE).

In a specific implementation scenario, the information transmitted by the UE belongs to application-layer information so that it cannot be received directly by the base station. The information originally belonging to the application layer needs to be transmitted to a physical layer via a cross-layer NE so that the base station can receive the information and perform radio resource management such as resource allocation according to the received information.

The quality of experience metrics is defined as the real perception degree of a user for a certain service, and the quality of experience metrics reflects the final satisfaction degree of the user for the service performance in a quantified manner and it includes several different measure indices. In this implementation scenario, the quality of experience metrics includes the queue state information. After receiving the quality of experience metrics including the queue state information, the base station initiates a process of adjusting the resources allocated to the UEs according to the queue state information.

Moreover, the cross-layer NE also acquires relevant information of the UEs in the same eMBMS multicast group connected to the cross-layer NE, and transmits the information to the base station so that the base station can learn which UEs belong to the same eMBMS multicast group.

In other implementation scenarios, the cross-layer function may be integrated at the base station side, and this may eliminate the formation of the cross-layer NE for message transmission. The queue state information belonging to the application-layer information that is transmitted by the UE is directly received by the base station, and then the base station converts the application-layer information into physical-layer information through the cross-layer function integrated therein and reads contents comprised in the information for subsequent processing. Because the UEs may keep moving all the time and the coverage of one cross-layer NE may be limited, several cross-layer NEs are required in order to accomplish the task of receiving messages transmitted by the UEs. However, the arrangement of the cross-layer NEs between the base station and the UEs may be omitted after integrating the cross-layer function into the base station, thereby effectively saving resources.

S202: calculating a time and a cycle at which each of the UEs in the multicast group transmits its respective queue state information according to the quality of experience metrics and the UE information of the UEs that join in the multicast group.

In a specific implementation scenario, after receiving the quality of experience metrics including the queue state information and the relevant UE information of UEs in a same eMBMS multicast group, the base station calculates randomly or at regular intervals a time and a cycle at which each of part or all of the UEs in the same eMBMS multicast group transmits its respective queue state information. The initial time at which the first UE transmits the queue state information thereof may be selected randomly by the base station, or a suitable time is selected by the base station according to the current communication condition. The base station may immediately choose to receive the queue state information transmitted by the first UE, or to receive the information at a fixed time. For example, the frequency when the UE is used is greater in the day and the base station is required to process data of a large number of UEs at the same time, so the base station may be set to start to receive the queue state information transmitted by the first UE at 7 a. m.

In this embodiment, $t_k$ represents the time at which each of the UEs transmits its respective queue state information that is calculated by the base station, and $T_k$ represents the cycle at which each of the UEs transmits its respective queue state information that is calculated by the base station. In a specific implementation scenario, $t_k$ represents the initial time at which the UE transmits the queue state information, so $t_k$ transmitted to each of the UEs by the base station is the same; and $T_k$ represents the time period elapsed after the initial time for each of different UEs to transmit the queue state information, so $T_k$ transmitted to each of the UEs by the base station is different.

In another specific implementation scenario, $t_k$ represents the time at which each of the UEs transmits its respective queue state information, so $t_k$ transmitted to each of the UEs by the base station is different; and $T_k$ represents the time required for transmitting the queue state information by all of the UEs in the whole eMBMS multicast group, so $T_k$ transmitted to each of the UEs by the base station is the same.

In another specific implementation scenario, $t_k$ represents the initial time at which the UE transmits the queue state information, so $t_k$ transmitted to each of the UEs by the base station is the same; and $T_k$ represents the time interval between transmitting the queue state information respectively by two adjacent UEs, so $T_k$ transmitted to each of the UEs by the base station is the same. In this implementation scenario, the base station needs to further set an order in which different UEs transmit the queue state information.

In yet another specific implementation scenario, $t_k$ represents the time at which each of the UEs transmits its respective queue state information, so $t_k$ transmitted to each of the UEs by the base station is different; and $T_k$ represents the transmission time interval for each of different UEs to transmit the queue state information, so $T_k$ transmitted to each of the UEs by the base station is different.

S203: transmitting the time and the cycle to the UEs through the cross-layer NE.

In a specific implementation scenario, the base station is mainly configured to perform radio resource management such as resource allocation, so information and instructions transmitted by the base station is on the physical layer. However, the UE is mainly configured to process information belonging to the application layer, so the time and the cycle calculated by the base station randomly or at regular intervals cannot be directly transmitted to the UE and need to be transmitted to the application layer from the physical layer through the cross-layer NE. Only in this way can the UE receive the time and the cycle and transmit the queue state information according to the time and the cycle.

In other implementation scenarios, the cross-layer function may be integrated at the base station side, and this may eliminate the formation of the cross-layer NE for message transmission. The time and the cycle initially belonging to the physical-layer information calculated by the base station may be converted into the application-layer information through the cross-layer function integrated in the base station and then directly transmitted to the UE. Thus, the arrangement of the cross-layer NE between the UEs and the base station may be omitted, thereby effectively saving resources.

S204: receiving, by a base station, queue state information transmitted in a time division manner by different user equipments (UEs) in a multicast group.

S205: estimating queue state information of at least another part of UEs in the multicast group according to the received queue state information of the UEs.

The steps S204 and S205 are substantially the same as the steps S101 and S102 in the first embodiment of the method for multicasting according to the present disclosure and can achieve effects similar to those of the steps S101 and S102, and thus will not be further described herein.

As can be known from the above descriptions, in this embodiment, the base station calculates the time and the cycle at which each of the UEs in the multicast group transmits its respective queue state information according to the quality of experience metrics and the UE information of the UEs that join in the multicast group from the cross-layer NE, and transmits the time and the cycle to the UEs through the cross-layer NE so that the UEs transmit the real-time measured queue state information to the base station at regular intervals according to the calculated time and cycle, and the base station can estimate the queue state information of at least another part of UEs in the same eMBMS multicast group according to the received queue state information, thereby reducing the uplink resource consumption.

Figure 4:
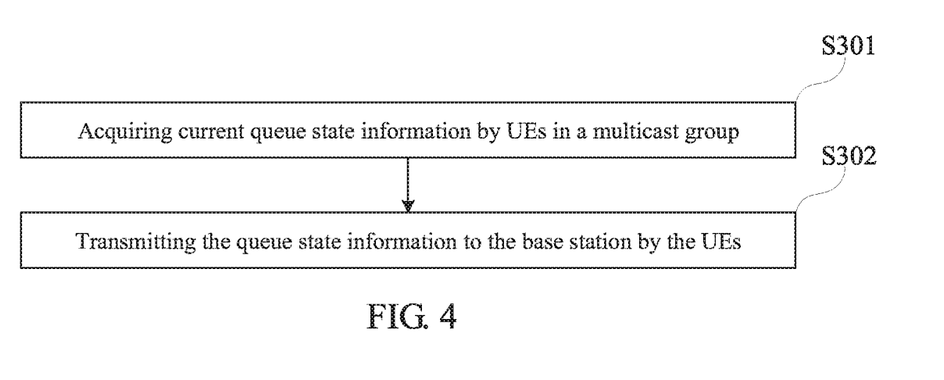
FIG. 4 is a schematic flowchart diagram of a third embodiment of the method for multicasting according to the present disclosure.

Referring to FIG. 4, FIG. 4 is a schematic flowchart diagram of a third embodiment of the method for multicasting according to the present disclosure. The method for multicasting according to the present disclosure comprises the following steps of:

S301: acquiring current queue state information by UEs in a multicast group.

In a specific implementation scenario, one eMBMS multicast group comprises at least one base station and several UEs connected with the base station in a wireless manner. Each of different UEs measures the queue state information thereof to obtain the current queue state information.

S302: transmitting the queue state information to the base station by the UEs.

The queue state information of one UE represents the state of a playback buffer of the UE. When the rate at which the video data stream is transmitted by the base station is too fast as compared to the data transmission rate of the UE or the video data volume is excessively large as compared to the capacity of the playback buffer, the video data packet transmitted by the base station cannot be received completely by the UE so that the video cannot be played smoothly, thereby influencing the user experience. When the data volume of the video transmitted by the base station is excessively small as compared to the capacity of the playback buffer, the video data packet transmitted by the base station will be lost during the transmission so that the base station needs to re-transmit the data packet being lost, thereby causing the waste of resources.

Therefore, the UE transmits the queue state information to the base station for the purpose of enabling the base station to adjust the rate at which the video data stream is transmitted and the video data volume according to the queue state information. Fluctuations may occur randomly in transmission channels to influence the transmission rate and quality, and the capacity of the playback buffer of each of the UEs also changes dynamically. Therefore, the UE needs to transmit the queue state information to the base station at regular intervals so that the base station can adjust the resource allocated to the UE timely according to the change in the queue state information of the UE (e.g., adjust the rate at which the video data stream is transmitted and the video data volume or the like) to make the resource allocated to the UE matches the current queue state information of the UE.

In a specific implementation scenario, the UEs transmit the real-time measured queue state information to the base station in a time division manner. Since resources of an uplink of a base station are limited, the uplink may possibly be blocked and some data may even be lost when a relatively large number of UEs are connected to the base station and thus require the uplink to transmit the queue state information of the multiple UEs at the same time. In order to avoid the occurring of the above situation, different UEs transmit its respective queue state information to the base station in a time division manner, i.e., UEs connected to the same base station in one eMBMS multicast group transmit the queue state information to the base station by turns in a certain order.

In other implementation scenarios, the action of transmitting the queue state information by the UEs to the base station may also be triggered by an event. For example, in a transmission cycle, the UE having the poorest queue state information transmits the queue state information thereof to the base station.

In other implementation scenarios, the base station establishes an uplink dedicated control channel, and the UEs transmit the queue state information to the base station in a time division manner through the uplink dedicated control channel, thereby ensuring the high reliability and the high rate of the transmission.

As can be known from the above descriptions, in this embodiment, the UEs measure the queue state information thereof and transmit the real-time measured queue state information to the base station in a time division manner so that the uplink resource consumption can be reduced and the base station can adjust resources allocated to the UEs according to the queue state information.

Figure 5:
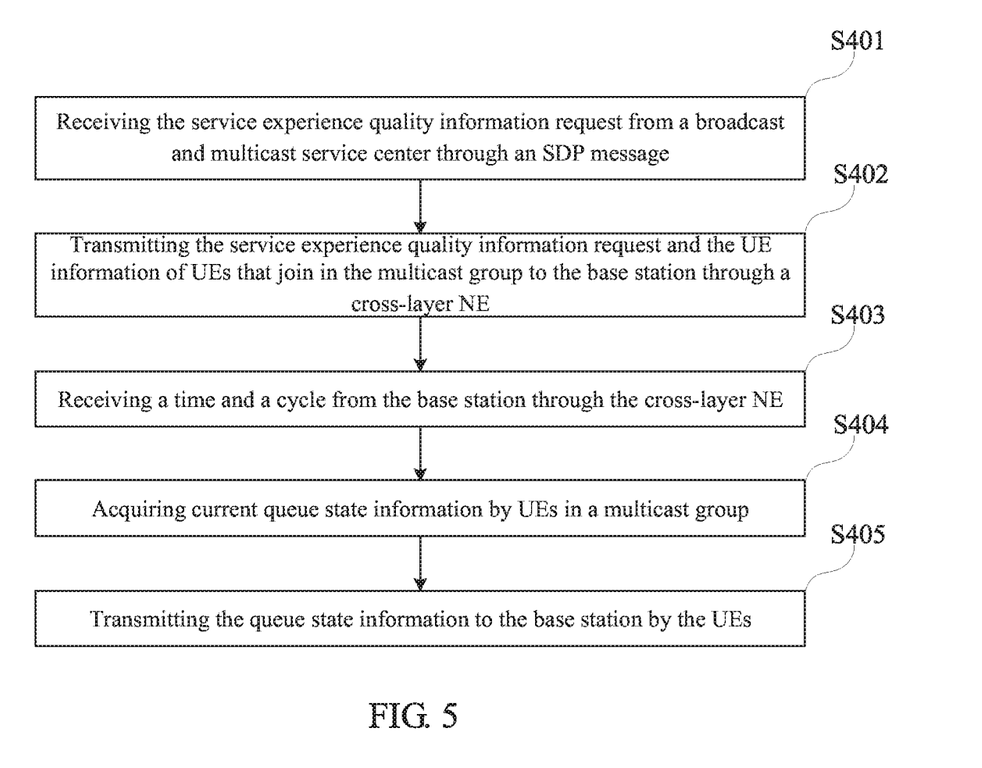
FIG. 5 is a schematic flowchart diagram of a fourth embodiment of the method for multicasting according to the present disclosure.

Referring to FIG. 5, FIG. 5 is a schematic flowchart diagram of a fourth embodiment of the method for multicasting according to the present disclosure. The method for multicasting according to the present disclosure comprises the following steps of:

S401: receiving the quality of experience metrics from a broadcast and multicast service center through a Session Description Protocol (SDP) message.

In a specific implementation scenario, the broadcast and multicast service center in one eMBMS multicast group transmits the SDP message carrying the quality of experience metrics to a mobile UE to inform the UE of items that need to undergo quality of experience information test. In this embodiment, the quality of experience metrics includes the queue state metrics, i.e., the UE needs to measure the queue state information.

In this implementation scenario, the broadcast and multicast service center informs the UE to measure the queue state information. In other implementation scenario, the base station may also determine that the resource allocation needs to be performed based on the queue state information by determining the number of UEs currently connected to the base station and other connection parameters, and then informs the UEs to measure the queue state information.

S402: transmitting the quality of experience metrics and the UE information of UEs that join in the multicast group to the base station through a cross-layer NE.

In a specific implementation scenario, the UE transmits the quality of experience metrics received from the broadcast and multicast service center to the base station through the cross-layer NE. The information transmitted by the UE belongs to the application-layer information, while the base station can only process information belonging to the physical-layer information. Therefore, the base station cannot directly receive and process the information transmitted by the UE. The information originally belonging to the application layer needs to be transmitted to the physical layer via a cross-layer NE so that the base station can receive the information and perform radio resource management such as resource allocation according to the received information. The quality of experience metrics reflects the final satisfaction degree of the user for the service performance in a quantified manner and it includes several different measure indices. In this implementation scenario, the quality of experience metrics includes the queue state metrics.

In other implementation scenarios, the UE may also generate a new quality of experience metrics suitable for the base station according to the quality of experience metrics received form the broadcast and multicast service center, and transmit the new quality of experience metrics to the base station through the cross-layer NE.

In this implementation scenario, the UE transmits the UE information thereof together with the quality of experience metrics to the base station through the cross-layer NE. In other implementation scenarios, the UE information may also be acquired by the cross-layer NE automatically from the UE, and the UE information is transmitted to the base station together with the quality of experience metrics transmitted by the UE.

In other implementation scenarios, the base station is integrated with the cross-layer function, so the UE can directly transmit the queue state information belonging to the application-layer information to the base station. Thus, the arrangement of the cross-layer NE between the base station and the UEs may be omitted, thereby effectively saving resources.

S403: receiving a time and a cycle from the base station through the cross-layer NE.

In a specific implementation scenario, the base station calculates the time and the cycle at which each of the UEs in the eMBMS multicast group transmits its respective queue state information according to the received quality of experience metrics and the UE information of UEs in the eMBMS multicast group, and transmits the time and the cycle to the corresponding UE. The information transmitted by the base station belongs to the physical layer, while the information processed by the UE belongs to the application layer. Thus, the UE needs to convert the physical-layer information into the application-layer information through the cross-layer NE in order to receive and process the time and the cycle transmitted by the base station.

In other implementation scenarios, the base station is integrated with the cross-layer function to convert the time and the cycle belonging to the physical-layer information into the application-layer information, so the UE can directly receive the time and the cycle belonging to the application-layer information from the base station. Thus, the arrangement of the cross-layer NE between the base station and the UEs may be omitted, thereby effectively saving resources.

S404: acquiring current queue state information by UEs in a multicast group.

The step S404 is substantially the same as the step S301 in the third embodiment of the method for multicasting according to the present disclosure and can achieve the effect similar to that of the step S301, and thus will not be further described herein.

S405: transmitting the queue state information to the base station by the UEs.

In a specific implementation scenario, the UEs transmit the real-time measured queue state information to the base station on time according to the received time and cycle calculated by the base station.

As can be known from the above descriptions, in this embodiment, the UE receives messages from and transmits messages to the base station through the cross-layer NE, and transmits the quality of experience metrics including the queue state metrics and the UE information thereof to the base station so that the base station can calculate the time and the cycle at which each of the UEs in the eMBMS multicast group transmits its respective queue state information according to the received information. Then, the UE receives the time and the cycle transmitted by the base station and transmits the queue state information to the base station according to the time and cycle, thereby reducing the uplink resource consumption and avoiding the waste of resources without influencing the play effect.

Figure 6:
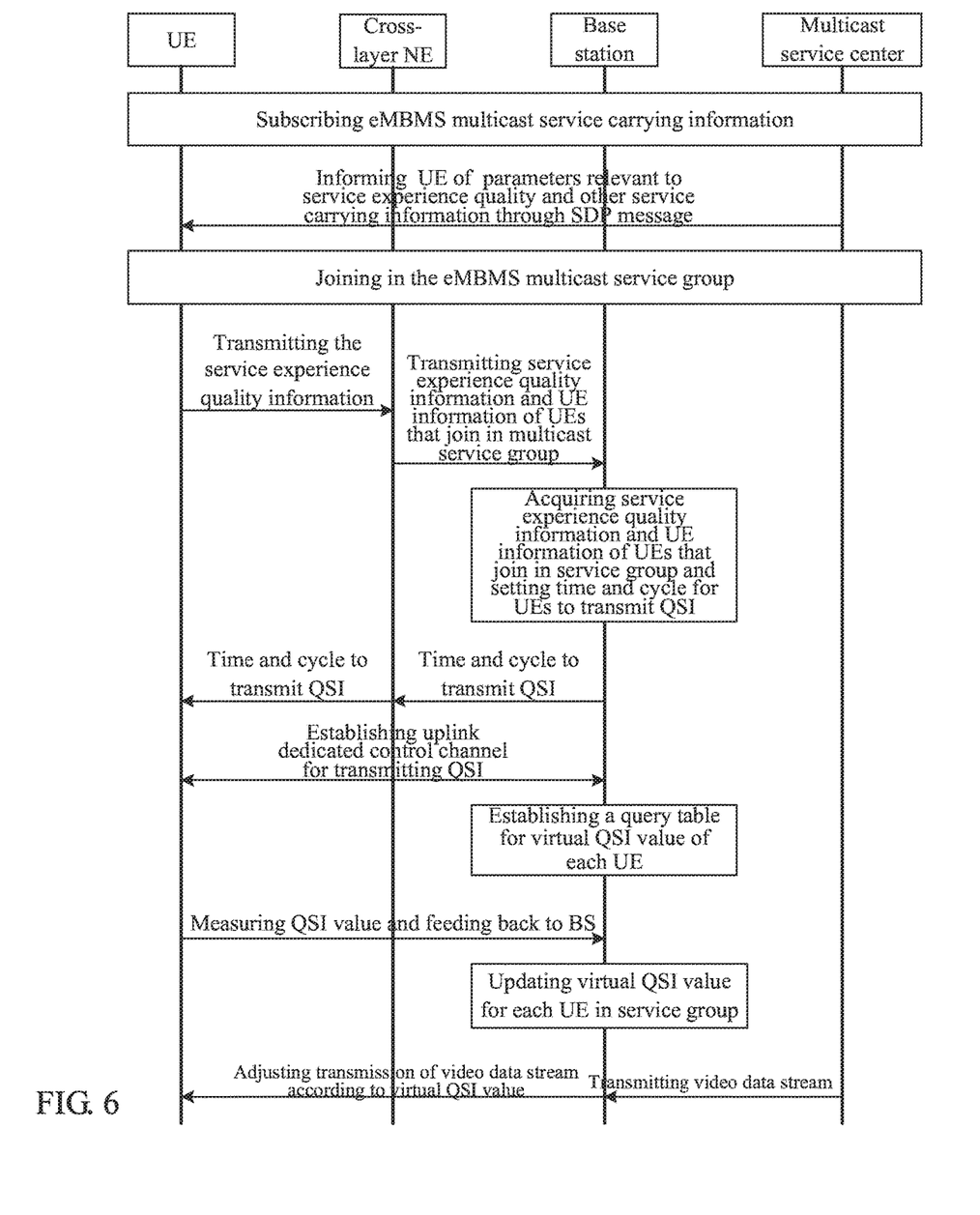
FIG. 6 is a schematic flowchart diagram of a fifth embodiment of the method for multicasting according to the present disclosure.

Referring to FIG. 6, FIG. 6 is a schematic flowchart diagram of a sixth embodiment of the method for multicasting according to the present disclosure. In a specific implementation scenario, all of the UE, the cross-layer NE, the base station and the broadcast and multicast service center subscribe eMBMS multicast service information. The UE, the cross-layer NE, the base station and the broadcast and multicast service center need to first subscribe the eMBMS multicast service information in order to join in one eMBMS multicast group. The broadcast and multicast service center adds the queue state metrics and other relevant parameters into the quality of experience metrics. The quality of experience metrics is transmitted to the UE through an SDP message that carries the quality of experience metrics including the queue state information and other relevant parameters, thereby informing the UE to perform relevant tests of the quality of experience metrics including measuring the queue state information and other relevant parameters.

The UE, the cross-layer NE, the base station and the broadcast and multicast service center join in one eMBMS multicast group. The UE transmits the quality of experience metrics including the queue state metrics to the base station through the cross-layer NE according to the received SDP message, in order to inform the base station to perform the service experience information test including measuring the queue state information. Meanwhile, the UE transmits the UE information thereof to the base station through the cross-layer NE so that the base station can receive the UE information of the UE that joins in one eMBMS multicast group and connects to the base station through the cross-layer NE. Moreover, the base station calculates the time $t_k$ and the cycle $T_k$ at which the UE transmits the queue state information according to the received quality of experience metrics and the UE information.

The base station transmits the calculated time $t_k$ and cycle $T_k$ to the UE through the cross-layer NE, and establishes an uplink dedicated control channel in the uplink for receiving the queue state information transmitted by the UE that joins in one eMBMS multicast group and connects to the base station. Meanwhile, the base station presets a virtual queue state information table for each of the UEs in the eMBMS multicast group connected to the base station.

After receiving the time $t_k$ and the cycle $T_k$ calculated by the base station, the UE transmits the real-time measured queue state information to the base station through the uplink dedicated control channel on time according to the time $t_k$ and the cycle $T_k$. The base station adds the real-time measured queue state information and the queue state information of other UEs that is estimated according to the real-time measured queue state information into the preset virtual queue state information table at positions corresponding to the respective UEs.

The specific estimation method is as follows: the base station receives the real-time queue state information $Q_k(t+1)$ transmitted by a UE k at a time t+1. Since the UEs transmit the queue state information by turns in this implementation scenario, the UE k does not transmit the queue state information thereof at the time ahead of t+1 by one cycle of interval. i.e., at the time t. Therefore, the base station estimates the queue state information. $\tilde{Q}_k(t)$ of the UE k and the queue state information $\tilde{Q}_n(t)$ of other UEs at the time t, and estimates the queue state information $\tilde{Q}_n(t+1)$ of other UEs (wherein n≠k) according to the following estimation equation:

$$\tilde{Q}_n(t+1)=\tilde{Q}_n(t)+(Q_k(t+1)-\tilde{Q}_k(t))$$

In other implementation scenarios, if the UE n is right the UE transmitting the real-time queue state information at the time t, then the estimation equation may be modified into $\tilde{Q}_n(t+1)=Q_n(t)+(Q_k(t+1)-\tilde{Q}_k(t))$.

The broadcast and multicast service center transmits the required video data to the base station, and the base station adjusts resource allocation such as the transmission rate and the video data volume for different UEs according to the real-time measured or estimated queue state information of each of the UEs in the virtual queue state information table so that the resource allocated to each of different UEs matches the queue state information of the UE. In this way, the video can be played smoothly by the UE and the waste of resources is avoided.

As can be known from the above descriptions, in this embodiment, the base station calculates the time and the cycle at which the UE connected to the base station transmits the queue state information and transmits the time and the cycle to the UE so that the UE can transmit the queue state information according to the time and the cycle calculated by the base station. The base station can estimate the queue state information of other UEs according to the queue state information of one UE at a time, and adjusts the resources allocated to the corresponding UEs according to the queue state information. In this way, the video can be played smoothly by the UE and the waste of resources is avoided.

Figure 7:
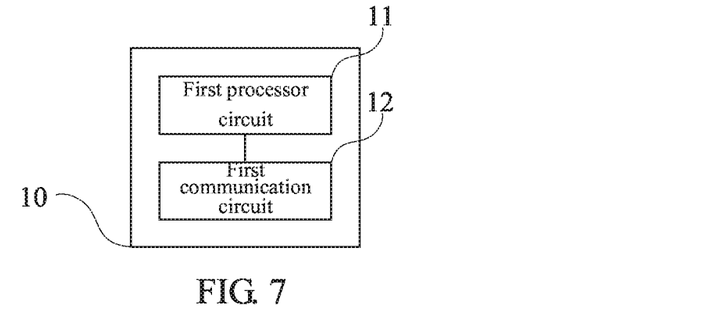
FIG. 7 is a schematic structural view of an embodiment of a base station according to the present disclosure.
Figure 8:
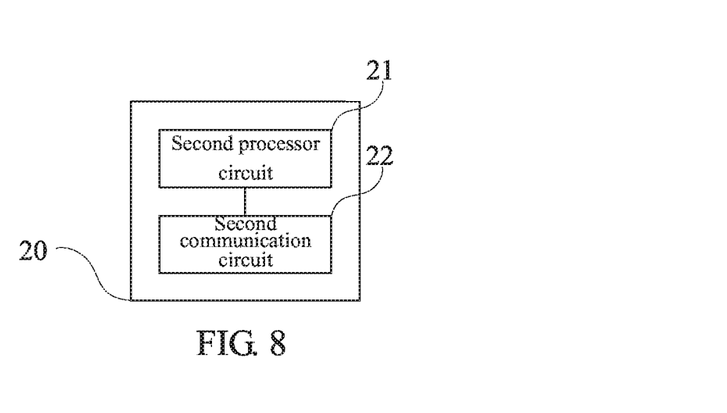
FIG. 8 is a schematic structural view of an embodiment of a UE according to the present disclosure.

Referring to FIG. 6, FIG. 6 is a schematic structural view of an embodiment of a base station according to the present disclosure. Referring to FIG. 7, FIG. 7 is a schematic structural view of an embodiment of a UE according to the present disclosure. A base station 10 comprises a first processor II and a first communication circuit 12 electrically coupled to each other. A UE 20 comprises a second processor 21 and a second communication circuit 22 electrically coupled to each other. The base station 10 exchanges information with the second communication circuit 22 of the UE 20 through the first communication circuit 12. The first processor circuit 11 of the base station 11 is further configured to calculate the time and the cycle at which the UE 20 transmits the queue state information according to the information received by the first communication circuit, estimate the queue state information of the UE, and adjust the resources allocated to different UEs according to the queue state information. The first communication circuit 12 of the base station 10 and the second communication circuit 22 of the UE 20 are further used for information transmission with the cross-layer NE and the broadcast and multicast service center.

In actual operations, the first processor circuit 11 of the base station 10 controls the first communication circuit 12, and the second processor circuit 21 of the UE 20 controls the second communication circuit 22 to execute the method for multicasting shown in any embodiment of FIG. 1, and FIG. 3 to FIG. 6.

As can be known from the above descriptions, in this embodiment, the first processor circuit of the base station controls the first communication circuit to exchange information with the second communication circuit controlled by the second processor circuit of the UE, estimates the queue state information of other UEs according to the queue state information transmitted by the second communication circuit of the UE, and adjusts resources allocated to different UEs accordingly, thereby ensuring the play quality and reducing the waste of resources.

Figure 9:
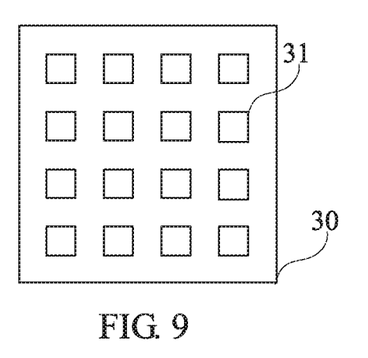
FIG. 9 is a schematic structural view of an embodiment of a device with a storage capability according to the present disclosure.

Referring to FIG. 9, FIG. 9 is a schematic structural view of an embodiment of a device with a storage capability according to the present disclosure. A device 30 with a storage capability is stored with at least one program or instruction 31 which, when being executed, accomplish the method for multicasting as shown in FIG. 1, and FIG. 3 to FIG. 6. In one embodiment, the device with the storage capability may be a storage chip or a hard disk in the UE, or other read-write storage tools such as a mobile hard disk, a USB flash drive, or a compact disk, or a server and so on.

As can be known from the above descriptions, in this embodiment, the program or instruction stored in the device with the storage capability of the present disclosure may be executed to accomplish the operations of transmitting the queue state information, estimating other queue state information according to the received queue state information, and adjusting the resource allocation according to the queue state information, thereby avoiding the waste of resources and reducing the uplink resource consumption without influencing the play effect.

The present disclosure differs from the prior art in that, the base station calculates the times and the cycles at which the UEs transmit the queue state information in a time division manner, the UEs transmit the respective real-time measured queue state information to the base station according to the times and the cycles in a time division manner, and the base station estimates the queue state information of other UEs according to the received queue state information and adjusts the resources allocated to the respective UEs according to the queue state information, thereby reducing the uplink resource consumption and avoiding the waste of resources without influencing the play effect.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A method for multicasting, comprising:
receiving, by a base station, queue state information (QSI) transmitted in a time division manner by different user equipments (UEs) in a multicast group, in which the queue state information of one UE represents the state of a playback buffer level of the UE;
estimating queue state information of at least another part of the UEs in the multicast group according to the received queue state information,
wherein the estimating queue state information of at least another part of the UEs in the multicast group according to the received queue state information comprises:
defining the UEs whose QSI has been the currently received as the first UEs, and at least another part of the UEs in the multicast group whose queue state information has not been currently received as the second UEs, and then estimating the queue state information of the second UEs according to the following equations:

estimated queue state information of the second UEs at a time $t+1$=estimated queue state information of the second UEs at a time $t$+(real-time measured queue state information of the first UEs at the time $t+1$−estimated queue state information of the first UEs at the time $t$); or estimated queue state information of the second UEs at a time $t+1$=real-time measured queue state information of the second UEs at a time $t$+(real-time measured queue state information of the first UEs at the time $t+1$−estimated queue state information of the first UEs at the time $t$).

2. The method of claim 1, further comprising the following step after the step of estimating queue state information of at least another part of UEs in the multicast group:

updating the respective queue state information of the first UEs and the second UEs that are currently obtained into a queue state information state table, the queue state information state table being preset by the base station and configured to store current queue state information of all UEs in the multicast group.

3. The method of claim 1, further comprising the following steps before the step of receiving, by a base station, queue state information transmitted in a time division manner by different user equipments (UEs) in a multicast group:

receiving a quality of experience metrics and UE information of UEs that join in the multicast group from a cross-layer network element (NE);

calculating a time and a cycle at which each of the UEs in the multicast group transmits its respective queue state information according to the quality of experience (QOE) metric and the UE information of the UEs that join in the multicast group; and transmitting the time and the cycle to the UEs through the cross-layer NE.

4. The method of claim 3, wherein,
all the UEs in the multicast group transmit the respective queue state information at different times and at different cycles; or
a part of the UEs in the multicast group transmit the respective queue state information at different times and at different cycles; or
all the UEs in the multicast group transmit the respective queue state information at different times but at the same cycle; or
a part of the UEs in the multicast group transmit the respective queue state information at different times but at the same cycle.

5. The method of claim 3, wherein,
the base station calculates, randomly or at regular intervals, the times and the cycles at which all or a part of the UEs in the multicast group transmit the respective queue state information, and transmits the times and the cycles to the UEs through the cross-layer NE.

6. The method of claim 1, wherein,
receiving, by the base station, the queue state information transmitted in a time division manner by different UEs in the multicast group comprises:
receiving, by the base station, through an uplink dedicated control channel the queue state information transmitted in a time division manner by different UEs in the multicast group.

7. A device with a storage capability, the device being stored with instructions which, when being executed, accomplish the method of claim 1.

8. A method for multicasting, comprising:
acquiring current queue state information by UEs in a multicast group, in which the queue state information of one UE represents the state of a playback buffer level of the UE;
transmitting the queue state information to the base station by the UEs, wherein different ones of the UEs in the multicast group are preset to transmit the respective queue state information in a time division manner so that, according to the queue state information, queue state information of at least another part of the UEs in the multicast group is estimated by the base station, wherein the method further comprises the following step before the step of transmitting the queue state information to the base station by the UEs:

transmitting a QOE metrics and UE information of UEs that join in the multicast group to the base station through a cross-layer NE; and
receiving a time and a cycle from the base station through the cross-layer NE, the time and the cycle being calculated by the base station according to the QOE metrics and the UE information of UEs that join in the multicast group.

9. The method of claim 8, further comprising the following step before the step of transmitting the QOE metrics and the UE information of UEs that join in the multicast group to the base station through the cross-layer NE:
receiving the QOE metrics from a broadcast and multicast service center through a Session Description Protocol (SDP) message.

10. A base station, comprising a first processor and a first communication circuit coupled to each other, wherein the first processor operates in combination with the first communication circuit to execute operations of:
receiving queue state information (QSI) transmitted in a time division manner by different user equipments (UEs) in a multicast group, in which the queue state information of one UE represents the state of a playback buffer level of the UE;
estimating queue state information of at least another part of the UEs in the multicast group according to the received queue state information,
wherein the estimating queue state information of at least another part of the UEs in the multicast group according to the received queue state information comprises:
defining the UEs whose QSI has been the currently received as the first UEs, and at least another part of the UEs in the multicast group whose queue state information has not been currently received as the second UEs, and then estimating the queue state information of the second UEs according to the following equations:

estimated queue state information of the second UEs at a time $t+1$=estimated queue state information of the second UEs at a time $t$+(real-time measured queue state information of the first UEs at the time $t+1$−estimated queue state information of the first UEs at the time $t$); or estimated queue state information of the second UEs at a time $t+1$=real-time measured queue state information of the second UEs at a time $t$+(real-time measured queue state information of the first UEs at the time $t+1$−estimated queue state information of the first UEs at the time $t$).

11. The base station of claim 10, wherein after the operation of estimating queue state information of at least another part of UEs in the multicast group, the first processor operates in combination with the first communication circuit to further execute an operation of:
updating the respective queue state information of the first UEs and the second UEs that are currently obtained into a queue state information state table, the queue state information state table being preset by the base station and configured to store current queue state information of all UEs in the multicast group.

12. The base station of claim 10, wherein before the operation of receiving queue state information transmitted in a time division manner by different user equipments (UEs) in a multicast group, the first processor operates in combination with the first communication circuit to further execute operations of:

receiving a quality of experience metrics and UE information of UEs that join in the multicast group from a cross-layer network element (NE);

calculating a time and a cycle at which each of the UEs in the multicast group transmits its respective queue state information according to the quality of experience (QOE) metric and the UE information of the UEs that join in the multicast group; and transmitting the time and the cycle to the UEs through the cross-layer NE.

13. The base station of claim 12, wherein, all the UEs in the multicast group transmit the respective queue state information at different times and at different cycles; or a part of the UEs in the multicast group transmit the respective queue state information at different times and at different cycles; or all the UEs in the multicast group transmit the respective queue state information at different times but at the same cycle; or a part of the UEs in the multicast group transmit the respective queue state information at different times but at the same cycle.

14. The base station of claim 12, wherein the base station calculates, randomly or at regular intervals, the times and the cycles at which all or a part of the UEs in the multicast group transmit the respective queue state information, and transmits the times and the cycles to the UEs through the cross-layer NE.

15. A UE, comprising a second processor and a second communication circuit coupled to each other, wherein the second processor operates in combination with the second communication circuit to execute operations of:

acquiring current queue state information by UEs in a multicast group, in which the queue state information of one UE represents the state of a playback buffer level of the UE;

transmitting the queue state information to the base station by the UEs, wherein different ones of the UEs in the multicast group are preset to transmit the respective queue state information in a time division manner so that, according to the queue state information, queue state information of at least another part of the UEs in the multicast group is estimated by the base station, wherein before the operation of transmitting the queue state information to the base station by the UEs, the second processor operates in combination with the second communication circuit to execute the following operation:

transmitting a QOE metrics and UE information of UEs that join in the multicast group to the base station through a cross-layer NE; and receiving a time and a cycle from the base station through the cross-layer NE, the time and the cycle being calculated by the base station according to the QOE metrics and the UE information of UEs that join in the multicast group.

16. The UE of claim 15, wherein before the operation of transmitting the QOE metrics and the UE information of UEs that join in the multicast group to the base station through the cross-layer NE, the second processor operates in combination with the second communication circuit to execute an operation of:

receiving the QOE metrics from a broadcast and multicast service center through a Session Description Protocol (SDP) message.

* * * * *